(12) United States Patent
Filippov et al.

(10) Patent No.: US 10,958,913 B2
(45) Date of Patent: Mar. 23, 2021

(54) APPARATUS AND METHOD FOR DIRECTIONAL INTRA PREDICTION USING A FITTING PLANE AND A PLURALITY OF PRIMARY REFERENCE SAMPLES AS WELL AS A PLURALITY OF SECONDARY REFERENCE SAMPLES

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/735,231

(22) Filed: Jan. 6, 2020

(65) Prior Publication Data
US 2020/0145670 A1     May 7, 2020

Related U.S. Application Data

(63) Continuation of application No. PCT/RU2017/000488, filed on Jul. 5, 2017.

(51) Int. Cl.
*H04N 19/159*     (2014.01)
*H04N 19/105*     (2014.01)
(Continued)

(52) U.S. Cl.
CPC ........... *H04N 19/159* (2014.11); *G06F 17/18* (2013.01); *H04N 19/105* (2014.11); *H04N 19/132* (2014.11); *H04N 19/176* (2014.11)

(58) Field of Classification Search
CPC .. H04N 19/159; H04N 19/105; H04N 19/132; H04N 19/176; H04N 19/174; H04N 19/593; G06F 17/18
See application file for complete search history.

(56) References Cited

U.S. PATENT DOCUMENTS

| 2013/0022123 A1* | 1/2013 | Ueda ...................... H04N 19/51 |
| | | 375/240.16 |
| 2014/0092980 A1* | 4/2014 | Guo ...................... H04N 19/105 |
| | | 375/240.16 |

(Continued)

FOREIGN PATENT DOCUMENTS

WO     2018070896 A1     4/2018

OTHER PUBLICATIONS

Guo et al., "Direction based Angular Intra Prediction," Joint Collaborative Team on Video Coding (JCT-VC) of ITU-T SG16 WP3 and ISO/IEC JTC1/SC29/WG11, Torino, Italy, JCTVC-F122, pp. 1-7, International Telecommunication Union, Geneva, Switzerland (Jul. 2011).

(Continued)

*Primary Examiner* — Richard T Torrente
(74) *Attorney, Agent, or Firm* — Leydig, Voit & Mayer, Ltd.

(57) ABSTRACT

A video coding block is intra-predicted on the basis of a plurality of primary reference samples from a first set of neighboring video coding blocks. A fitting plane is determined on the basis of the plurality of primary reference samples and defines a plurality of fitting samples. For a selected directional intra prediction mode, a plurality of secondary reference samples are generated on the basis of the plurality of primary reference samples and the plurality of fitting samples. The secondary reference samples are located in a second set of neighboring video coding blocks. The sample values of the current video coding block are predicted on the basis of the plurality of primary reference sample values and the plurality of secondary reference sample values.

14 Claims, 8 Drawing Sheets

(51) Int. Cl.
*H04N 19/132* (2014.01)
*H04N 19/176* (2014.01)
*G06F 17/18* (2006.01)

(56) References Cited

U.S. PATENT DOCUMENTS

2017/0264904 A1* 9/2017 Koval .................. H04N 19/159
2017/0272757 A1* 9/2017 Xu ....................... H04N 19/593
2020/0053358 A1* 2/2020 Moon .................... H04N 19/13

OTHER PUBLICATIONS

Li et al., "Gradient Intra Prediction for Coding of Computer Animated Videos," 2006 IEEE Workshop on Multimedia Signal Processing, Victoria, BC, pp. 50-53, Institute of Electrical and Electronics Engineers, New York, New York (Oct. 2006).

Sze et al., "High Efficiency Video Coding (HEVC) Algorithms and Architectures," Integrated Circuits and Systems, pp. 1-384, Springer Publishing, New York, New York (2014).

Galpin et al., "Adaptive Clipping in JEM2.0," Joint Video Exploration Team (JVET) of ITU-T SG16 WP3 and ISO/IEC JTC1/SC29/WG11, Geneva, CH, JVET-O0040-r3, pp. 1-7, International Telecommunication Union, Geneva, Switzerland (May 26-Jun. 1, 2016).

"Information technology—High efficiency coding and media delivery in heterogeneous environments—Part 2: High efficiency video coding," ISO/IEC 23008-2, pp. 1-13, International Organization for Standardization, Geneva, Switzerland (Dec. 1, 2013).

"Series H: Audiovisual and Multimedia Systems Infrastructure of audiovisual services—Coding of moving video; High efficiency video coding," ITU-T H.265, pp. 1-664, International Telecommunication Union, Geneva, Switzerland (Dec. 2016).

"Series H: Audiovisual and Multimedia Systems, Infrastructure of audiovisual services—Coding of moving video; Advanced video coding for generic audiovisual services," ITU-T H.264, pp. 1-812, International Telecommunication Union, Geneva, Switzerland (Apr. 2017).

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

Galpin et al., "EE7 Adaptive Clipping in JEM3.0," Joint Video Exploration Team (JVET) of ITU-T SG16 WP3 and ISO/IEC JTC1/SC29/WG11, Chengdu, CN, JVET-D0033-r2, pp. 1-10, International Telecommunication Union, Geneva, Switzerland (Oct. 15-21, 2016).

Huang et al., "EE2.1: Quadtree plus binary tree structure integration with JEM tools," Joint Video Exploration Team (JVET) of ITU-T SG16 WP3 and ISO/IEC JTC1/SC29/WG11, Geneva, CH, JVET-C0024, pp. 1-5, International Telecommunication Union, Geneva, Switzerland (May 26-Jun. 1, 2016).

"Future video coding: Joint Exploration Model 1 (JEM1) for future video coding investigation," Telecommunication Standardization Sector, Study Period 2013-2016, Study Group 16, TD 213 (WP 3/16), pp. 1-20, International Telecommunication Union, Geneva, Switzerland (Oct. 12-23, 2015).

* cited by examiner

APPARATUS AND METHOD FOR DIRECTIONAL INTRA PREDICTION USING A FITTING PLANE AND A PLURALITY OF PRIMARY REFERENCE SAMPLES AS WELL AS A PLURALITY OF SECONDARY REFERENCE SAMPLES

CROSS-REFERENCE TO RELATED APPLICATIONS

This application is a continuation of International Application No. PCT/RU2017/000488, filed on Jul. 5, 2017, the disclosure of which is hereby incorporated by reference in its entirety.

TECHNICAL FIELD

The disclosure relates to the field of video coding. More specifically, the disclosure relates to an apparatus and a method for intra prediction of a video coding block as well as an encoding apparatus and a decoding apparatus comprising such an intra-prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source picture into video coding blocks. Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g., coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed; i.e. the prediction error is transformed with a discrete cosine transform or a discrete sine transform (in the HEVC/H.265 standard, it is applied to intra-coded blocks) and quantized. Hence, reconstructed pixels contain quantization noise, which can become apparent, for example, as blockiness between units, ringing artifacts along with sharp edges, etc. that in-loop filters such as Deblocking Filter (DBF), Sample Adaptive Offset (SAO) and Adaptive Loop Filter (ALF) try to suppress. The use of sophisticated prediction coding (such as motion compensation and intra-prediction) and partitioning techniques (e.g., quadtree for CUs and PUs as well as residual quadtree for TUs in the HEVC/H.265 standard and quadtree plus binary tree for the JEM reference software from version JEM-3.0 onwards) allowed the standardization committee to significantly reduce the redundancy in PUs. The fundamental difference between the quadtree (QT) and quadtree plus binary tree (QTBT) partitioning mechanisms is that the latter one enables not only square but also rectangular blocks by using partitioning based on both quad- and binary-tree.

In the H.264/AVC standard, four intra-prediction modes are available for 16×16 blocks for a luma color component. One of those modes is plane-based and can predict a source-signal gradient within a block. The formula used to calculate pixels to be predicted using the plane-based mode is expressed as follows:

$$p_{pred}[x,y]=\text{clip } 3(0, 2^n-1, (a+b(x-7)+c(y-7)+16)>>5),$$

where a, b and c are plane (multiple regression) parameters. It is worth noting that the clip3 function, $p_{pred}[x, y]=\text{clip } 3(p_{min}, p_{max}, \hat{p}_{pred}[x, y])$, is used in the equation above. In the clip3 function, $p_{min}$ and $p_{max}$ are the minimum and maximum values of pixels that are possible for a given bit depth (e.g., $p_{min}=0$ and $p_{max}=255$ for bit depth 8) respectively; $\hat{p}_{pred}[x,y]$ and $p_{pred}[x, y]$ are values of predictors at the position [x, y] before and after clipping respectively.

According to the HEVC/H.265 standard, 35 intra prediction modes are available and include a planar mode (the intra-prediction mode index is 0), a DC mode (the intra-prediction mode index is 1), and 33 directional modes (the intra-prediction mode index ranges from 2 to 34). From the JEM-1.0 software onwards, the set of directional intra-prediction modes has been extended up to 65 modes (almost doubled) by decreasing a step angle between directional intra-prediction modes by a factor of 2. As seen from the listed modes above, the plane-based mode was adopted neither for HEVC/H.265 nor for the JEM software. In fact, this mode was replaced by the planar one that does not always result in a plane-based predictor.

As discussed in "EE7 Adaptive Clipping in JEM3.0" by F. Galpin et al., Contribution JVET-D0033 to the 4$^{th}$ JVET meeting, China, 2016, the adaptive clipping mechanism, initially proposed in "Adaptive Clipping in JEM2.0" by F. Galpin et al., Contribution JVET-00040 to the 3$^{rd}$ JVET meeting, Switzerland, 2016, is used to restrict pixel values in blocks (e.g., in a predictor) from the JEM-4.0 software onwards. This technique uses clipping bounds that are determined at the encoder side and are explicitly signaled in the bitstream, namely, in slice headers. Clipping bounds are defined as actual minimum $p_{min}(C)$ and maximum $p_{max}(C)$ sample values of coded pictures separately for every color component. Mathematically, adaptive clipping operation can be presented as follows:

$$p_{pred}(x,y,C) = \text{clip }3(p_{min}(C), p_{max}(C), \hat{p}_{pred}(x,y,C)) = \text{clip } A(\hat{p}_{pred}(x,y,C), C),$$

where C is an index of a selected color component. This mechanism, similar to the clip3( ) function, is directly applied to pixel values, e.g., within a predictor.

Prediction of a block may include steps of generating secondary reference samples that are located on the sides of the block that are not yet reconstructed and to be predicted, i.e. unknown pixels. Values of these secondary reference samples are derived from the primary reference samples which are obtained from the pixels of the previously reconstructed part of the picture, i.e., known pixels. Evidently, the block that is decoded first within a picture cannot be predicted using previously reconstructed pixels. The same situation occurs when a side of the block to be predicted is out of the picture boundary. In this situation primary reference samples are generated using a pre-defined set of rules. In case of H.265/HEVC standard, they are assigned to a value equal to half of the possible maximal value of a pixel that is determined by a bit depth of the corresponding picture color plane. There are different methods that generate secondary reference samples for predicting a block. Since values of the secondary reference samples depend on the primary reference samples, the step of calculating them could be performed implicitly when prediction of a pixel value is calculated. The planar intra-prediction mode of H.265/HEVC standard is an example of such a method.

However, the state-of-the-art approaches have a major problem: the directional intra-prediction does not always compensate for a gradual change of intensity within a block to be predicted. The gradual change of intensity observed in the source picture may vary in nature. A common case is the uneven lighting of textured or edge regions. In this case these regions have an overlay of at least two components: a directional component and a gradient component. However, the state-of-the-art intra prediction modes are classified into directional and non-directional ones and cannot succeed in handling a combination of these two components.

In light of the above, there is a need for improved devices and methods for video coding, which allow increasing the coding efficiency for intra prediction.

SUMMARY

It is an object of the disclosure to provide improved devices and methods for video coding, which allow increasing the coding efficiency for intra prediction.

The foregoing and other objects are achieved by the subject matter of the independent claims. Further implementation forms are apparent from the dependent claims, the description and the figures.

Generally, the disclosure relates to hybrid video coding (particularly intra-prediction) and introduces a novel method of generating secondary reference samples for intra-predicted blocks. This method can be combined with different mechanisms of filling in a block to be predicted (e.g., a mechanism used in the planar mode) to improve coding efficiency of conventional intra-prediction modes, such as planar, plane-based, DC and directional ones.

More specifically, the disclosure provides an improvement of intra-prediction by generating secondary reference samples using a combination of two types of prediction signals: gradient and directional one. The gradient prediction signals are constructed using modeling of reference samples based on Multiple Linear Regression (MLR). Parameters of this MLR-based model are used to calculate the gradient signal values at the positions of the primary reference samples. The directional prediction signals are calculated by projecting the offset values (also referred to as difference values) between the reference samples and gradient signals at the positions of the primary reference samples and projecting these difference values onto the positions of the secondary reference samples according to direction of the given intra-prediction mode.

Usage of this modeling raises a possibility to predict signal values comprising the following features: firstly, the texture or edge propagation direction may be different with the direction of gradient. Secondly, the resultant predicted values may fall out of the range of reference samples. Thus, embodiments of the disclosure hence provide in particular the following advantage: compression efficiency for natural pictures can be increased, since prediction of error signals comprises lower energy. Furthermore, embodiments of the disclosure can be easily implemented in codecs that use conventional intra-prediction mechanisms.

The following disclosure employs a plurality of terms which, in embodiments, have the following meaning: Slice—a spatially distinct region of a picture that is independently encoded/decoded. Slice header—Data structure configured to signal information associated with a particular slice. Video coding block (or short block)—an M×N (M-column by N-row) array of pixels or samples (each pixel/sample being associated with at least one pixel/sample value), or an M×N array of transform coefficients. Coding Tree Unit (CTU) grid—a grid structure employed to partition blocks of pixels into macro-blocks for video encoding. Coding Unit (CU)—a coding block of luma samples, two corresponding coding blocks of chroma samples of an image that has three sample arrays, or a coding block of samples of a monochrome picture or a picture that is coded using three separate color planes and syntax used to code the samples. Picture Parameter Set (PPS)—a syntax structure containing syntax elements that apply to zero or more entire coded pictures as determined by a syntax element found in each slice segment header. Sequence Parameter Set (SPS)—a syntax structure containing syntax elements that apply to zero or more entire coded video sequences as determined by the content of a syntax element found in the PPS referred to by a syntax element found in each slice segment header. Video Parameter Set (VPS)—a syntax structure containing syntax elements that apply to zero or more entire coded video sequences. Prediction Unit (PU)—a prediction block of luma samples, two corresponding prediction blocks of chroma samples of a picture that has three sample arrays, or a prediction block of samples of a monochrome picture or a picture that is coded using three separate color planes and syntax used to predict the prediction block samples. Transform Unit (TU)—a transform block of luma samples, two corresponding transform blocks of chroma samples of a picture that has three sample arrays, or a transform block of samples of a monochrome picture or a picture that is coded using three separate color planes and syntax used to predict the transform block samples. Supplemental enhancement information (SEI)—extra information that may be inserted into a video bitstream to enhance the use of the video. Luma—information indicating the brightness of an image sample. Chroma—information indicating the color of an image sample, which may be described in terms of red difference chroma component (Cr) and blue difference chroma component (Cb).

More specifically, according to a first aspect, the disclosure relates to an apparatus for intra prediction of a current video coding block of a frame of a video signal on the basis of a plurality of primary reference samples from a first set of neighboring video coding blocks of the current video coding block, the current video coding block comprising a plurality of samples, each sample being associated with a sample value and a position within the frame. The apparatus comprises a processing unit configured to: determine a fitting plane on the basis of the plurality of primary reference samples, wherein the fitting plane defines a plurality of fitting samples, each fitting sample being associated with a fitting sample value and a position within the frame; generate for a selected directional intra prediction mode a plurality of secondary reference samples on the basis of the plurality of primary reference samples and the plurality of fitting samples, wherein the plurality of secondary reference samples are located in a second set of neighboring video coding blocks of the current video coding block; and predict the sample values of the plurality of samples of the current video coding block on the basis of the plurality of primary reference sample values and the plurality of secondary reference sample values.

Thus, an improved apparatus for video coding is provided, which allows increasing the coding efficiency for intra prediction.

In a further possible implementation form of the first aspect, the processing unit is configured to determine the fitting plane on the basis of the plurality of primary reference samples by determining fitting plane parameters a, b and c on the basis of the plurality of primary reference samples such that the plurality of fitting sample values $\hat{p}_{pred}[x, y]$ are defined by the following equation:

$$\hat{p}_{pred}[x,y]=ax+by+c,$$

wherein x, y denote the position of the fitting sample within the frame.

In a further possible implementation form of the first aspect, the processing unit is configured to perform a multilinear regression, in particular a least squares method, for determining the fitting plane parameters on the basis of the plurality of primary reference samples.

In a further possible implementation form of the first aspect, the processing unit is further configured to clip the respective fitting plane parameters a, b and/or c, in case the respective fitting plane parameters a, b and/or c lie outside of respective predefined allowable ranges of fitting plane parameters.

In a further possible implementation form of the first aspect, for generating for the selected directional intra prediction mode the plurality of secondary reference samples on the basis of the plurality of primary reference samples and the plurality of fitting samples the processing unit is configured to: determine for each primary reference sample a respective primary offset or deviation value between the primary reference sample value and the corresponding fitting sample value; predict a respective secondary propagated offset value at each secondary reference sample position on the basis of at least a subset of the plurality of primary offset values and the selected directional intra prediction mode; and generate a respective secondary reference sample value on the basis of the respective secondary propagated offset value and the fitting sample value of the respective fitting sample.

In a further possible implementation form of the first aspect, the processing unit is configured to generate the respective secondary reference sample value on the basis of the respective secondary propagated offset value and the fitting sample value of the respective fitting sample by adding the respective secondary propagated offset value to the fitting sample value of the respective fitting sample.

In a further possible implementation form of the first aspect, the processing unit is configured to predict the respective secondary propagated offset value at each secondary reference sample position on the basis of at least a subset of the plurality of primary offset values and the selected directional intra prediction mode on the basis of an intra prediction mode defined in the HEVC/H.265 standard or a standard evolved therefrom.

In a further possible implementation form of the first aspect, the processing unit is configured to predict the sample values of the plurality of samples of the current video coding block on the basis of the plurality of primary reference sample values and the plurality of secondary reference sample values using a planar intra prediction mode.

In a further possible implementation form of the first aspect, the processing unit is configured to predict a respective sample value of a respective sample of the plurality of samples of the current video coding block on the basis of a weighted sum of a respective primary reference sample value and a respective secondary reference sample value.

In a further possible implementation form of the first aspect, in the weighted sum of a respective primary reference sample value and a respective secondary reference sample value the processing unit is configured to weight the respective primary reference sample value and the respective secondary reference sample value as a function of the distance between the respective primary reference sample and the respective sample and the distance between the respective secondary reference sample and the respective sample.

In a further possible implementation form of the first aspect, the first set of neighbouring video coding blocks of the current video coding block comprises a video coding block above the current video coding block and/or a video coding block to the left of the current video coding block and wherein the second set of neighbouring video coding blocks of the current video coding block comprises a video coding block below the current video coding block and/or a video coding block to the right of the current video coding block.

According to a second aspect, the disclosure relates to an encoding apparatus for encoding a current video coding block of a frame of a video signal, the current video coding block comprising a plurality of samples, each sample being associated with a sample value. The encoding apparatus comprises: an intra prediction apparatus according to the first aspect for providing a predicted video coding block; and an encoding unit configured to encode the current video coding block on the basis of the predicted video coding block.

Thus, an improved encoding apparatus for video coding is provided, which allows increasing the encoding efficiency for intra prediction.

According to a third aspect, the disclosure relates to a decoding apparatus for decoding an encoded video coding block of a frame of a video signal, the encoded video coding block comprising a plurality of samples, each sample being associated with a sample value. The decoding apparatus comprises: an intra prediction apparatus according to the first aspect for providing a predicted video coding block; and a restoration unit configured to restore a video coding block on the basis of an encoded video coding block and the predicted video coding block.

Thus, an improved decoding apparatus for video coding is provided, which allows increasing the decoding efficiency for intra prediction.

According to a fourth aspect, the disclosure relates to a method for intra prediction of a current video coding block of a frame of a video signal on the basis of a plurality of primary reference samples from a first set of neighboring video coding blocks of the current video coding block, the current video coding block comprising a plurality of samples, each sample being associated with a sample value and a position within the frame. The method comprises: determining a fitting plane on the basis of the plurality of primary reference samples, wherein the fitting plane defines a plurality of fitting samples, each fitting sample being associated with a fitting sample value and a position within the frame; generating for a selected directional intra prediction mode a plurality of secondary reference samples on the basis of the plurality of primary reference samples and the plurality of fitting samples, wherein the plurality of secondary reference samples are located in a second set of neighboring video coding blocks of the current video coding block; and predicting the sample values of the plurality of samples of the current video coding block on the basis of the plurality of primary reference sample values and the plurality of secondary reference sample values.

Thus, an improved method for video coding is provided, which allows increasing the coding efficiency for intra prediction.

The intra prediction method according to the fourth aspect of the disclosure can be performed by the intra prediction apparatus according to the first aspect of the disclosure. Further features of the intra prediction method according to the fourth aspect of the disclosure result directly from the functionality of the intra prediction apparatus according to the first aspect of the disclosure and its different implementation forms.

According to a fifth aspect, the disclosure relates to a computer program comprising program code for performing the method according to the fourth aspect when executed on a computer.

The disclosure can be implemented in hardware and/or software.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the disclosure may be placed. It is understood that other aspects may be utilized and structural or logical changes may be made without departing from the scope of the disclosure. The following detailed description, therefore, is not to be taken in a limiting sense, as the scope of the disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
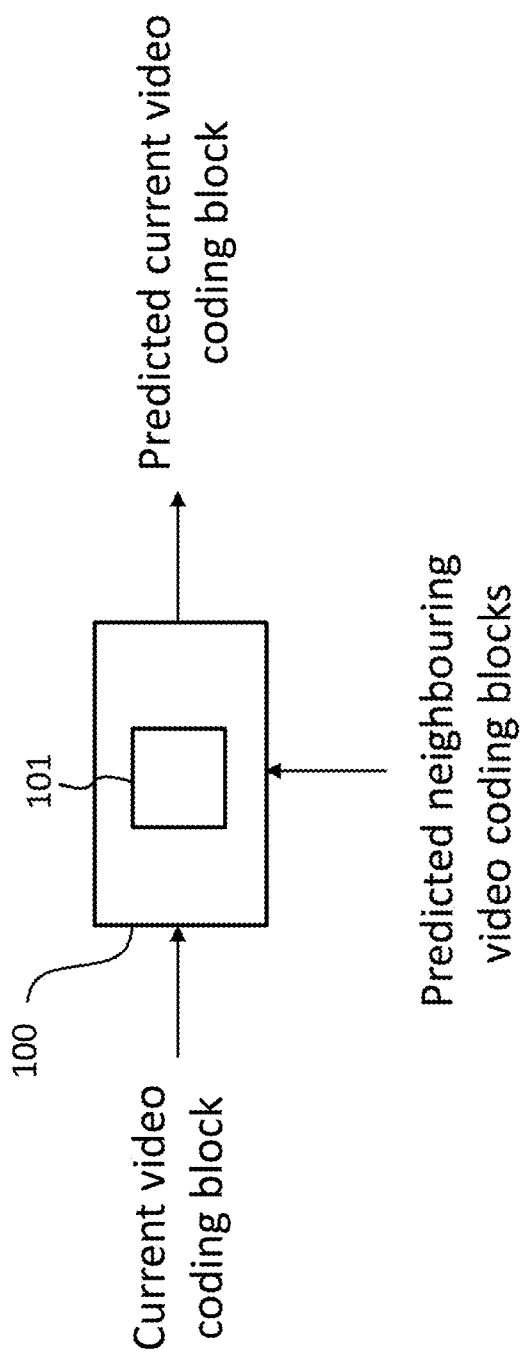
FIG. 1 shows a schematic diagram illustrating an intra prediction apparatus according to an embodiment.

FIG. 1 shows a schematic diagram illustrating an intra prediction apparatus 100 according to an embodiment.

Figure 4A:
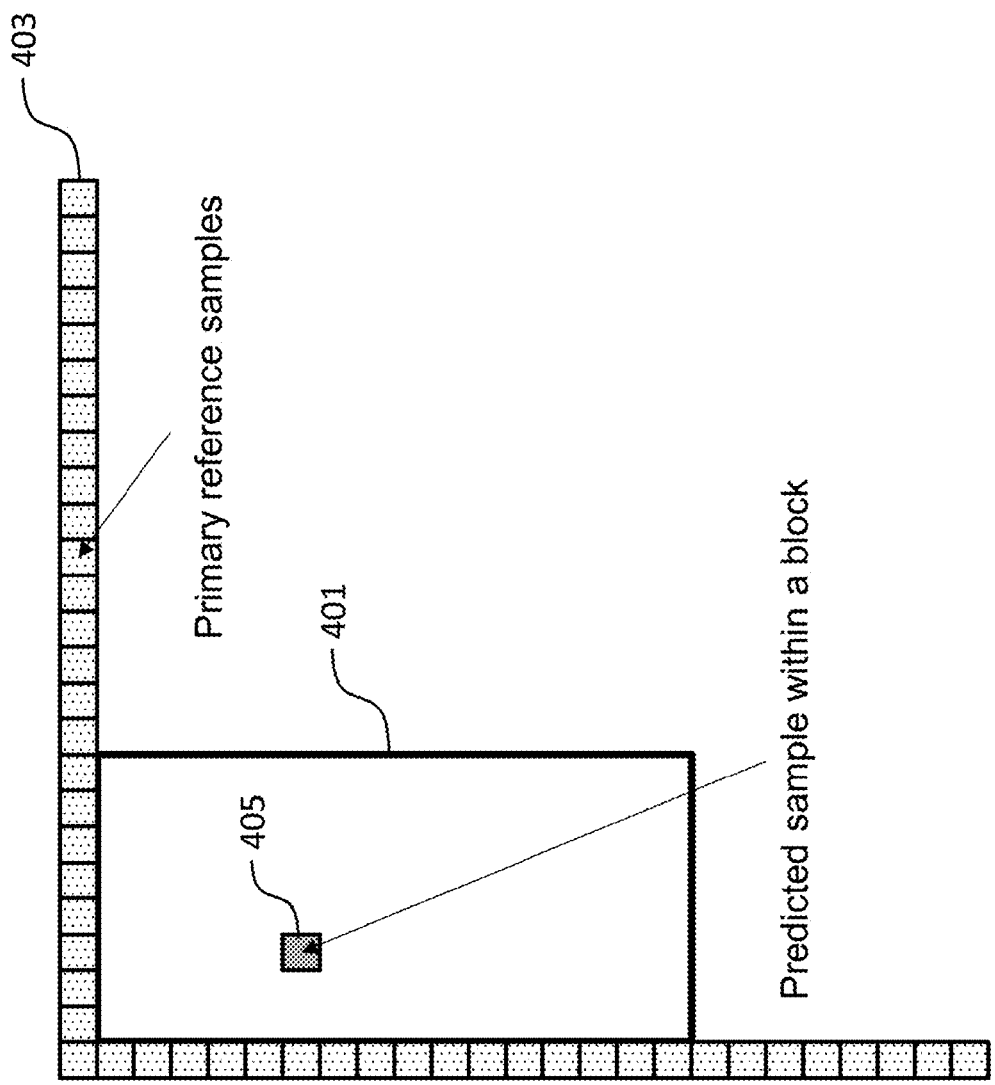
FIG. 4A shows a schematic diagram illustrating a video coding block to be predicted by an intra prediction apparatus according to an embodiment.

Under further reference to FIG. 4A, the intra prediction apparatus 100 is configured to intra predict a current video coding block 401 of a frame of a video signal on the basis of a plurality of primary reference samples 403 from a first set of neighboring video coding blocks of the current video coding block 401, wherein the current video coding block 401 comprises a plurality of samples 405, each sample being associated with a sample value and a position within the frame.

As can be taken from FIG. 1, the intra prediction apparatus 100 comprises a processing unit 101 configured to determine a fitting plane 501 (shown in FIG. 4B) on the basis of the plurality of primary reference samples 403, wherein the fitting plane 501 defines a plurality of fitting samples, each fitting sample being associated with a fitting sample value and a position within the frame. The processing unit 101 is further configured to generate a plurality of secondary reference samples 601 (shown in FIG. 6) on the basis of the plurality of primary reference samples 403 and the plurality of fitting samples, wherein the plurality of secondary reference samples 601 are located in a second set of neighboring video coding blocks of the current video coding block 401. Finally, the processing unit 101 is configured to predict the sample values of the plurality of samples 405 of the current video coding block 401 on the basis of the plurality of primary reference sample values and the plurality of secondary reference sample values.

As can be taken from FIGS. 4A, 6 and 7, in an embodiment, the first set of neighbouring video coding blocks of the current video coding block 401 comprises a video coding block above the current video coding block 401 and/or a video coding block to the left of the current video coding block 401 and wherein the second set of neighbouring video coding blocks of the current video coding block 401 comprises a video coding block below the current video coding block 401 and/or a video coding block to the right of the current video coding block 401.

Further embodiments of the intra prediction apparatus 100 will be described below.

Figure 2:
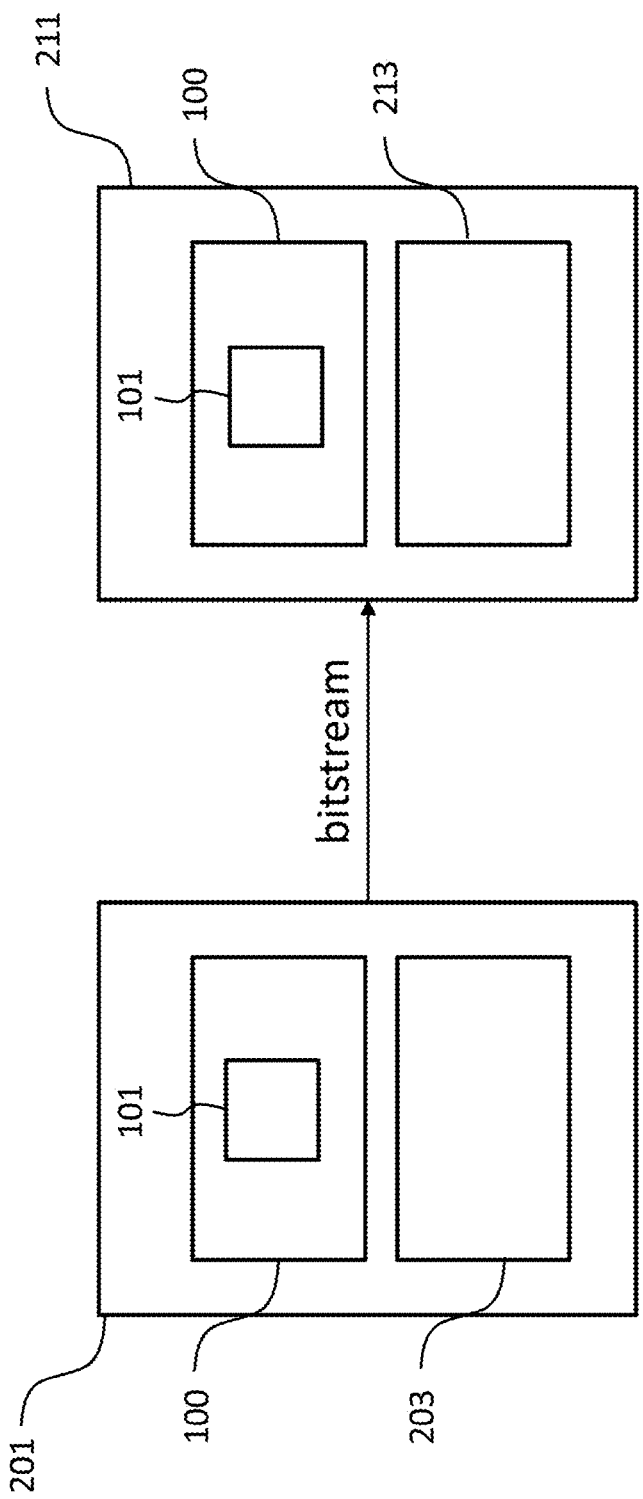
FIG. 2 shows a schematic diagram illustrating an encoding apparatus according to an embodiment and a decoding apparatus according to an embodiment.

FIG. 2 shows a schematic diagram illustrating an encoding apparatus 201 according to an embodiment and a decoding apparatus 211 according to an embodiment.

The encoding apparatus 201 is configured to encode a current video coding block 401 of a frame of a video signal, wherein the current video coding block 401 comprises a plurality of samples 405, each sample being associated with a sample value. The encoding apparatus 201 comprises the intra prediction apparatus 100 shown in FIG. 1 for providing a predicted video coding block and an encoding unit 203 configured to encode the current video coding block 401 on the basis of the predicted video coding block and providing the encoded current video coding block, for instance, in the form of a bitstream. Further embodiments of the encoding apparatus 201 will be described further below. In an embodiment, the encoding apparatus 201 could be implemented as a hybrid encoder, as defined, for instance, in the HEVC standard, and could comprise further components, such as an entropy encoder.

The decoding apparatus 211 is configured to decode the encoded video coding block of a frame of a video signal, which is contained in the bitstream provided by the encoding apparatus 201, wherein the encoded video coding block comprises a plurality of samples, each sample being associated with a sample value. The decoding apparatus 211 comprises the intra prediction apparatus 100 shown in FIG. 1 for providing a predicted video coding block and a restoration unit 213 configured to restore a video coding block on the basis of the encoded video coding block and the predicted video coding block. Further embodiments of the decoding apparatus 211 will be described further below. In an embodiment, the decoding apparatus 211 could be implemented as a hybrid decoder, as defined, for instance, in the HEVC standard, and could comprise further components, such as a decoding unit for providing a residual video coding block on the basis of the encoded video coding block.

Figure 3:
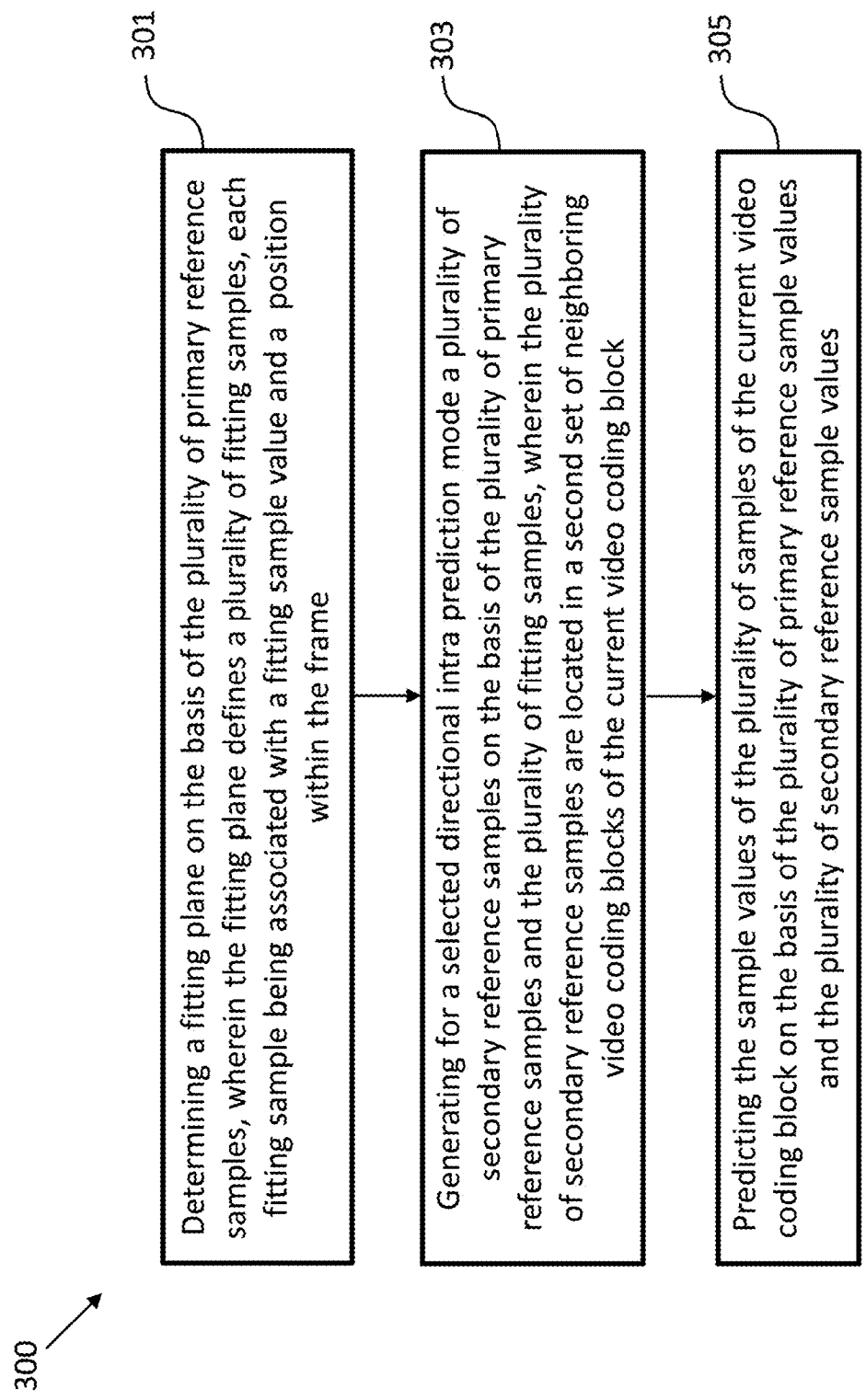
FIG. 3 shows a schematic diagram illustrating an intra prediction method according to an embodiment.

FIG. 3 shows a schematic diagram illustrating a method 300 for intra prediction of a current video coding block 401 of a frame of a video signal on the basis of a plurality of primary reference samples 403 from a first set of neighboring video coding blocks of the current video coding block 401 according to an embodiment, wherein the current video coding block 401 comprises a plurality of samples 405 and each sample is associated with a sample value and a position within the frame.

The intra prediction method 300 comprises a step 301 of determining a fitting plane 501 on the basis of the plurality of primary reference samples 403, wherein the fitting plane 501 defines a plurality of fitting samples, each fitting sample being associated with a fitting sample value and a position within the frame.

Moreover, the intra prediction method 300 comprises a step 303 of generating, for a selected directional intra prediction mode, a plurality of secondary reference samples 601 on the basis of the plurality of primary reference samples 403 and the plurality of fitting samples, wherein the plurality of secondary reference samples 601 are located in a second set of neighboring video coding blocks of the current video coding block 401.

Finally, the intra prediction method 300 comprises a step 305 of predicting the sample values of the plurality of samples 405 of the current video coding block 401 on the basis of the plurality of primary reference sample values and the plurality of secondary reference sample values. Further embodiments of the intra prediction method 300 will be described further below.

According to an embodiment of the disclosure, the intra prediction method 300 can be performed by the processing unit 101 of the intra prediction apparatus 100 mentioned above in FIG. 1. The detailed implementation of the method 300 in the intra prediction apparatus 100 will be discussed further below.

FIG. 4A shows a schematic diagram of an exemplary current video coding block 401 illustrating an aspect of the intra prediction apparatus 100 and the intra prediction method 300 according to an embodiment, in particular the relationship between primary reference samples (also referred to as pixels) 403 and intra predicted samples or pixels, wherein the pixel of the currently processed video coding block 401, i.e. the currently processed pixel/sample, is identified by a darker shade of grey and the primary reference pixels/samples 403 are identified by squares with dots.

Figure 4B:
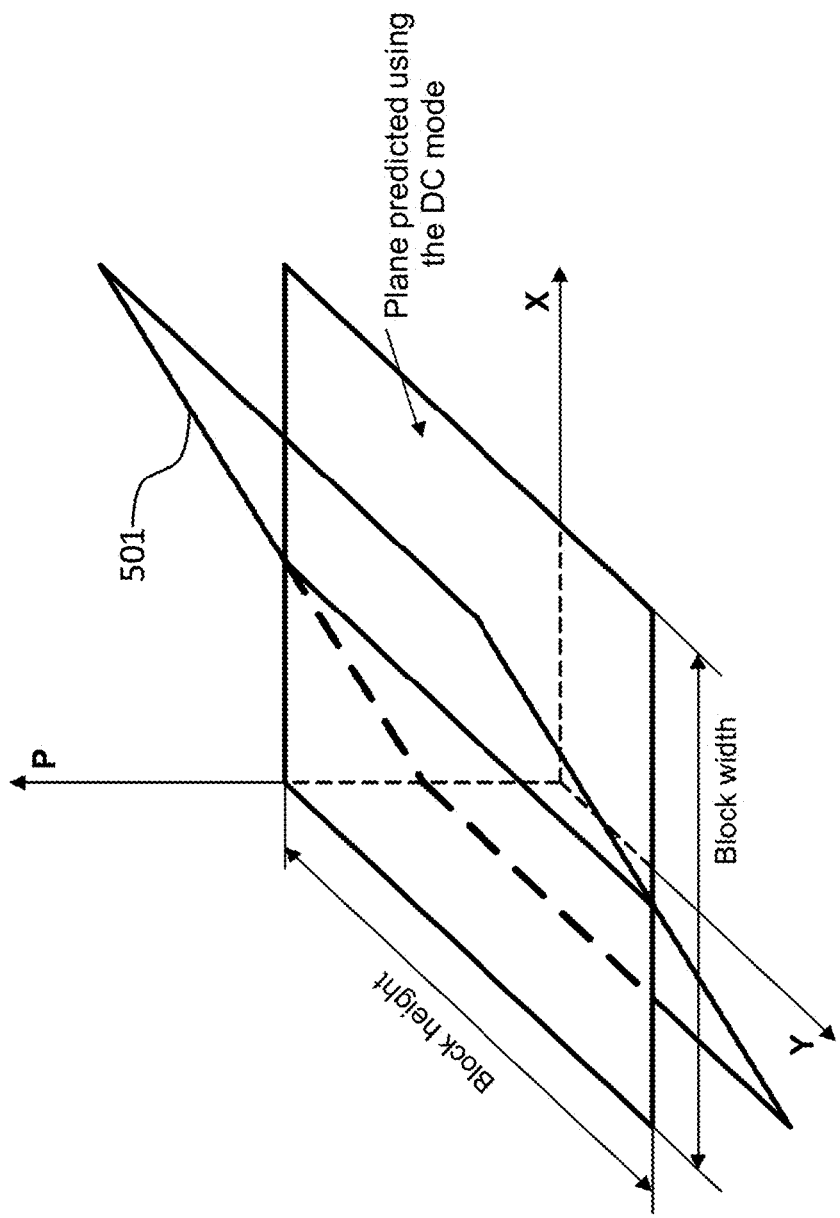
FIG. 4B shows a schematic diagram illustrating a fitting plane determined by an intra prediction apparatus according to an embodiment.

FIG. 4B shows a schematic diagram of a fitting plane 501 predicted by the processing unit 101 using a MLR-based model, wherein primary reference samples 403 as illustrated in FIG. 4A are used to estimate regression parameters of the MLR-based model for constructing the fitting plane 501. As a comparison, a fitting plane predicted by the DC mode in the HEVC/H.265 standard is also shown in FIG. 4B. Thus, the processing unit 101 is configured to estimate parameters of a Multiple Linear Regression (MLR) and fit a plane 501 to the primary reference samples 403 (step 1).

More specifically, in an embodiment, the processing unit 101 is configured to determine the fitting plane 501 on the basis of the plurality of primary reference samples 403 by determining fitting plane parameters a, b and c on the basis of the plurality of primary reference samples 403 such that the plurality of fitting sample values $\hat{p}_{pred}[x,y]$ are defined by the following equation:

$$\hat{p}_{pred}[x,y]=ax+by+c,$$

wherein x, y denote the position of the fitting sample within the frame.

In step 1, different approaches can be used for the Multiple Linear Regression (MLR). For instance, in an embodiment, the processing unit 101 is configured to perform a Multi-Linear Regression, in particular a least-squares method, for determining the fitting plane parameters on the basis of the plurality of primary reference samples 403. This well-known applicable least-square method provides such values of regression parameters that minimize the sum of error squares between the data used for estimating regression parameters (i.e., primary reference samples 403) and the values calculated using the above equation at the positions corresponding to primary reference samples 403. In fact, this step can be similar to the plane-based mode employed in the H.264/AVC standard.

In a step 2, the processing unit 101 can optionally clip the plane (regression) parameters, as the parameters estimated in step 1 are not guaranteed to fall within a practical range. Therefore, it can be found practical to perform their clipping in step 2. Moreover, a pre-defined threshold could be applied so that the parameters a, b and c will not exceed the corresponding pre-defined threshold value(s).

Thus, in an embodiment, the processing unit 101 of the intra prediction apparatus 100 is further configured to clip the respective fitting plane parameters, a, b and/or c, in case the respective fitting plane parameters a, b and/or c lie outside of respective predefined allowable ranges of fitting plane parameters.

In steps 3 and 4, the processing unit 101 of the intra prediction apparatus 100 is configured to use clipped plane parameters (the result from step 2) to calculate gradient signal values at positions of the secondary reference samples 601, $\hat{p}_{srs}$, and primary reference samples 403, $\hat{p}_{prs}$, respectively.

Figure 5:
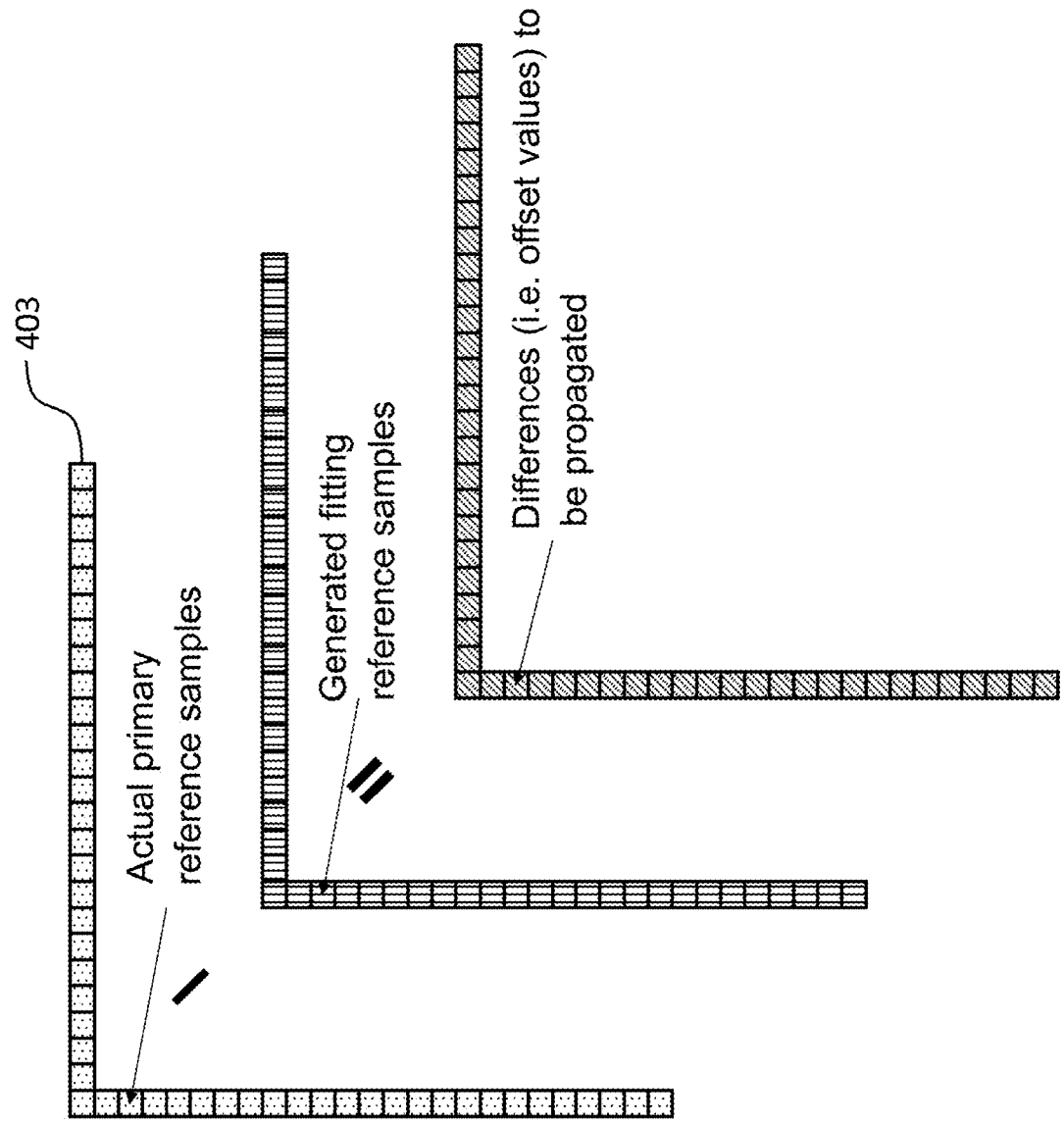
FIG. 5 shows a schematic diagram illustrating offset values determined by an intra prediction apparatus according to an embodiment.

In a step 5, the processing unit 101 of the intra prediction apparatus 100 is configured to subtract the result of the previous step, i.e. the gradient signal values of the primary reference samples 403, from the actual values of the primary reference samples 403, which is illustrated in FIG. 5. Thus, FIG. 5 shows a schematic diagram of an embodiment, wherein, for generating the plurality of secondary reference samples 601 on the basis of the plurality of primary reference samples 403 and the plurality of fitting samples for the selected directional intra prediction mode, the processing unit 101 is configured to determine for each primary reference sample a respective primary offset value between the primary reference sample value and the corresponding fitting sample value, wherein the primary offset value, the primary reference sample value and the corresponding fitting sample value are represented by squares with diagonal stripes, dots and vertical stripes in FIG. 5 respectively.

The offset value (also referred to as difference value) between the primary reference sample value and the corresponding fitting sample value can be explicitly expressed by the following equation:

$$\Delta[k] = p_{prs}[k] - \hat{p}_{prs}[k]$$

wherein $p_{prs}$ and $\hat{p}_{prs}$ denote the actual and generated primary reference sample values.

Figure 6:
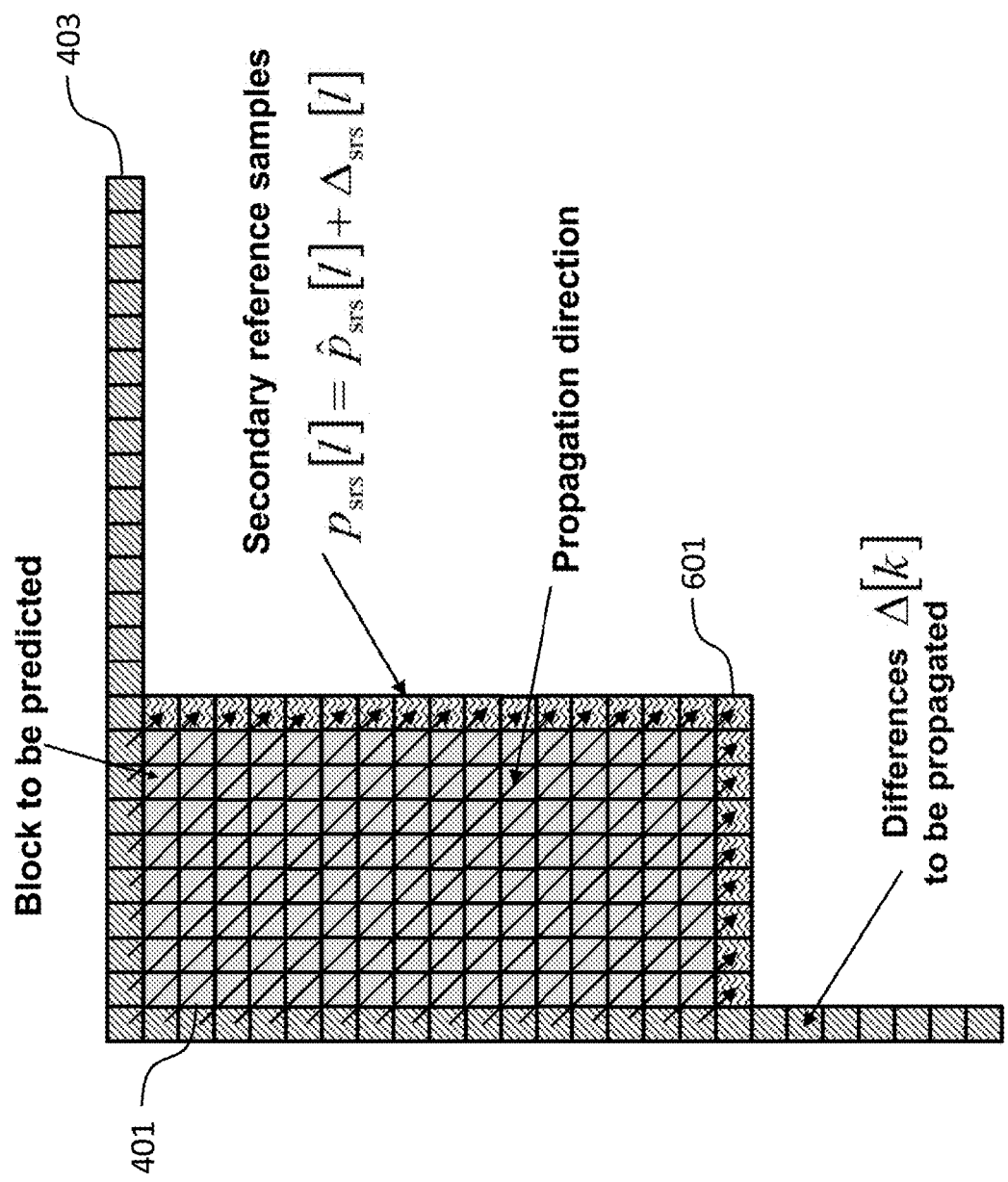
FIG. 6 shows a schematic diagram of a video coding block illustrating different aspects of an intra prediction apparatus according to an embodiment.

In further steps, the processing unit 101 is configured to predict a respective secondary offset value at each secondary reference sample position on the basis of at least a subset of the plurality of primary offset values and the selected intra prediction mode, and to generate a respective secondary reference sample value on the basis of the respective secondary offset value and the fitting sample value of the respective fitting sample, which are implemented as steps 6 and 7 respectively and are explained with reference to FIG. 6 below, which illustrates the relationship between primary reference pixels/samples 403, secondary reference pixels/samples 601 and intra predicted pixels/samples according to embodiments of the disclosure.

In FIG. 6, the grey square of pixels represents the exemplary currently processed video coding block 401. For the exemplary current video coding block 401 shown in FIG. 6, the primary reference pixels or samples 403 are the pixels in the row of pixels above the current video coding block 401 and the pixels in the column of pixels to the left of the current video coding block 401. Thus, in the embodiment shown in FIG. 6, the primary reference pixels 403 belong to neighboring video coding blocks, which already have been intra predicted, i.e. processed by the intra prediction apparatus 100. Moreover, the secondary reference pixels 601 $p_{srs}$ are the pixels in the row of pixels below the current video coding block 401 and the pixels in the column of pixels to the right of the current video coding block 401.

FIG. 6 illustrates, as an example, the case where the intra prediction apparatus 100 propagates the difference value (i.e., the offset value) between the actual 403 and generated primary reference samples on the basis of a selected directional intra prediction mode onto positions of secondary reference samples 601, which are identified in FIG. 6 by squares with zigzags. In an embodiment, the propagation can be performed by means of the directional intra prediction using sub-pixel interpolation mechanisms, wherein the direction of propagation is defined by the intra prediction mode defined for the block to be predicted.

FIG. 6 further illustrates, as an example, the case where, in step 7, the processing unit 100 of the intra prediction apparatus 100 is configured to generate the respective secondary reference sample value on the basis of the respective secondary offset value and the fitting sample value of the respective fitting sample by adding the respective secondary offset value to the fitting sample value of the respective fitting sample.

Furthermore, the processing unit 101 of the intra prediction apparatus 100 is configured to predict the respective secondary propagated offset value at each secondary reference sample position on the basis of at least a subset of the plurality of primary offset values and the selected directional intra prediction mode on the basis of an intra prediction mode defined in the HEVC/H.265 standard or a standard evolved therefrom.

Finally, in a step 8, the processing unit 101 of the intra prediction apparatus 100 is configured to predict the sample value of the sample of the currently processed video coding block 401, i.e. the currently processed sample.

Figure 7:
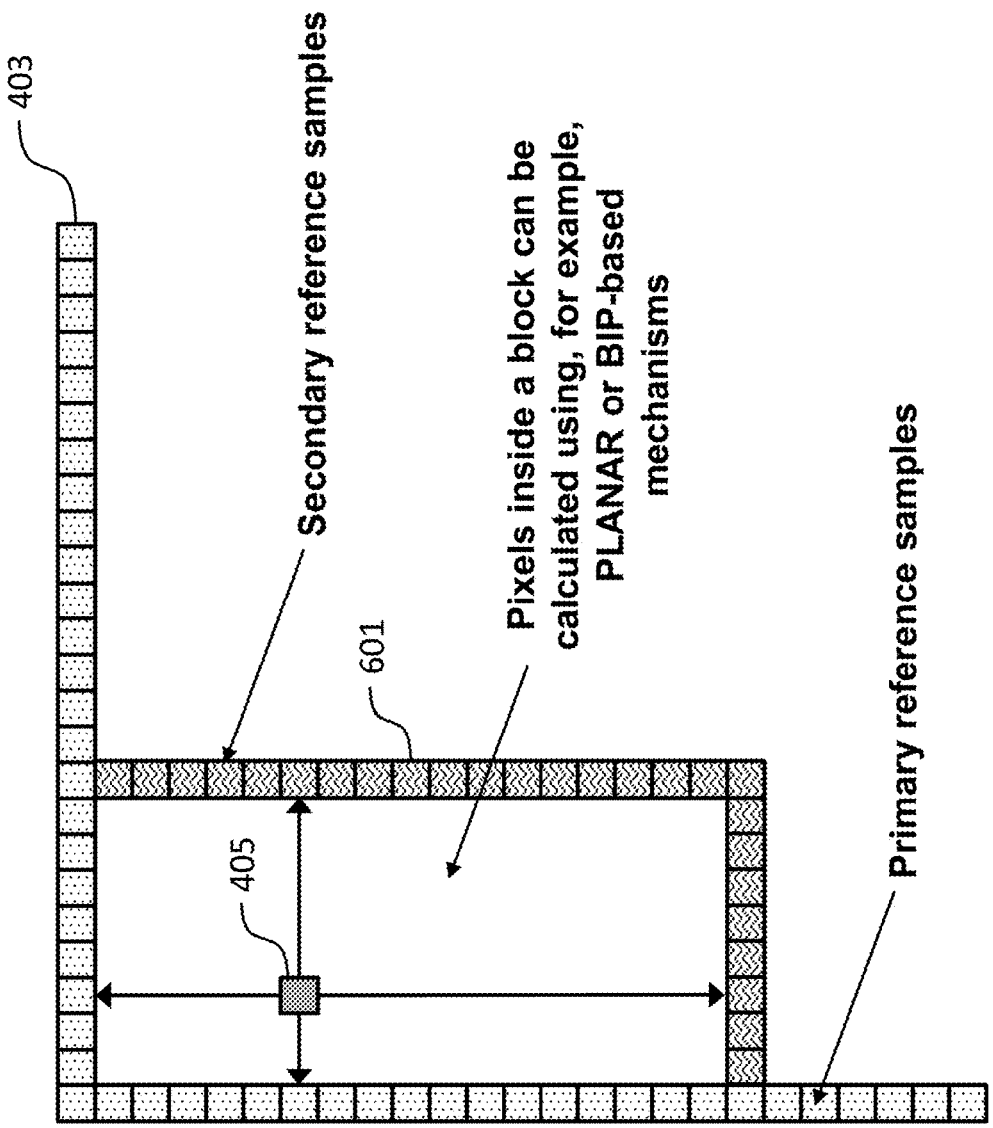
FIG. 7 shows a schematic diagram of a video coding block illustrating different aspects of an intra-prediction apparatus according to an embodiment.

FIG. 7 shows an exemplary current video coding block 401, illustrating an aspect of the intra prediction apparatus 100 and the intra prediction method 300 according to an embodiment, in particular the relationship between primary reference pixels 403, secondary reference pixels 601 and intra predicted pixels, wherein the grey square of pixels represents the exemplary currently processed video coding block 401 and the squares with dots and zigzags denote the primary 403 and secondary 601 reference samples respectively.

In an embodiment, the processing unit 101 of the intra prediction apparatus 100 is configured to predict the sample values of the plurality of samples 405 of the current video coding block 401 on the basis of the plurality of primary reference sample values and the plurality of secondary reference sample values using a planar intra prediction mode.

In an embodiment, the processing unit 101 is configured to predict a respective sample value of a respective sample of the plurality of samples 405 of the current video coding block 401 on the basis of a weighted sum of a respective primary reference sample value and a respective secondary reference sample value.

Furthermore, in the weighted sum of a respective primary reference sample value and a respective secondary reference sample value the processing unit 101 is configured to weight the respective primary reference sample value and the respective secondary reference sample value as a function of the distance between the respective primary reference sample and the respective sample and the distance between the respective secondary reference sample and the respective sample.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

What is claimed is:

1. An apparatus for intra prediction of a current video coding block of a frame of a video signal, the current video coding block comprising a plurality of samples, each sample having a sample value and a position within the frame, the apparatus comprising:
   a processing unit configured to:
   determine a fitting plane based on a plurality of primary reference samples located in a first set of neighboring video coding blocks of the current video coding block, wherein the fitting plane defines a plurality of fitting samples, each fitting sample having a fitting sample value and a position within the frame;
   generate, for a selected directional intra prediction mode, a plurality of secondary reference samples based on the plurality of primary reference samples and the plurality of fitting samples, wherein the plurality of secondary reference samples are located in a second set of neighboring video coding blocks of the current video coding block; and
   predict the sample values of the plurality of samples of the current video coding block based on the plurality of primary reference samples and the plurality of secondary reference samples,
   wherein for generating the plurality of secondary reference samples based on the plurality of primary reference samples and the plurality of fitting samples, the processing unit is configured to:
   determine, for each primary reference sample, a respective primary offset value between the primary reference sample value and a corresponding fitting sample value;
   predict a respective secondary offset value at each secondary reference sample position based on at least a subset of the plurality of primary offset values and the selected intra prediction mode; and
   generate a respective secondary reference sample value based on the respective secondary offset value and the fitting sample value of the respective fitting sample.

2. The apparatus of claim 1, wherein the processing unit is further configured to determine the fitting plane on the basis of the plurality of primary reference samples by determining fitting plane parameters a, b and c on the basis of the plurality of primary reference samples such that the plurality of fitting sample values $\hat{p}_{pred}[x,y]$ are defined by the following equation:

$$\hat{p}_{pred}[x,y]=ax+by+c,$$

wherein x,y denote the position of the fitting sample within the frame.

3. The apparatus of claim 2, wherein the processing unit is further configured to perform a multi-linear regression, using a least squares method, for determining the fitting plane parameters on the basis of the plurality of primary reference samples.

4. The apparatus of claim 3, wherein the processing unit is further configured to clip the respective fitting plane parameters a, b and/or c, in case the respective fitting plane parameters a, b and/or c lie outside of respective predefined allowable ranges of fitting plane parameters.

5. The apparatus of claim 1, wherein the processing unit is configured to generate the respective secondary reference sample value based on the respective secondary offset value and the fitting sample value of the respective fitting sample by adding the respective secondary offset value to the fitting sample value of the respective fitting sample.

6. The apparatus of claim 1, wherein the processing unit is configured to predict the respective secondary offset value at each secondary reference sample position based on at least a subset of the plurality of primary offset values and an intra prediction mode defined in the HEVC/H.265 standard or a standard evolved therefrom.

7. The apparatus of claim 1, wherein the processing unit is configured to predict the sample values of the plurality of samples of the current video coding block based on the plurality of primary reference sample values and the plurality of secondary reference sample values using a planar intra prediction mode.

8. The apparatus of claim 1, wherein the processing unit is configured to predict a respective sample value of a respective sample of the plurality of samples of the current video coding block based on a weighted sum of a respective primary reference sample value and a respective secondary reference sample value.

9. The apparatus of claim 8, wherein, in the weighted sum of the respective primary reference sample value and the respective secondary reference sample value, the processing unit is configured to weight the respective primary reference sample value and the respective secondary reference sample value as a function of a distance between the respective primary reference sample and the respective sample and a distance between the respective secondary reference sample and the respective sample.

10. The apparatus of claim 1, wherein the first set of neighbouring video coding blocks of the current video coding block comprises a video coding block above the current video coding block and/or a video coding block to the left of the current video coding block and wherein the second set of neighbouring video coding blocks of the current video coding block comprises a video coding block below the current video coding block and/or a video coding block to the right of the current video coding block.

11. An encoding apparatus for encoding a current video coding block of a frame of a video signal, the encoding apparatus comprising:
   an intra prediction apparatus according to claim 1 for providing a predicted video coding block; and
   an encoding unit configured to encode the current video coding block based on the predicted video coding block.

12. A decoding apparatus for decoding an encoded video coding block of a frame of a video signal, the decoding apparatus comprising:
   an intra prediction apparatus according to claim 1 for providing a predicted video coding block; and
   a restoration unit configured to restore a video coding block based on an encoded video coding block and the predicted video coding block.

13. A method for intra prediction of a current video coding block of a frame of a video signal the current video coding block comprising a plurality of samples, each sample having a sample value and a position within the frame, the method comprising:
   determining a fitting plane based on a plurality of primary reference samples located in a first set of neighboring video coding blocks of the current video coding block, wherein the fitting plane defines a plurality of fitting samples, each fitting sample having a fitting sample value and a position within the frame;
   generating, for a selected directional intra prediction mode, a plurality of secondary reference samples based on the plurality of primary reference samples and the plurality of fitting samples, wherein the plurality of secondary reference samples are located in a second set of neighboring video coding blocks of the current video coding block; and
   predicting the sample values of the plurality of samples of the current video coding block based on the plurality of primary reference sample values and the plurality of secondary reference sample values,
   wherein generating the plurality of secondary reference samples based on the plurality of primary reference samples and the plurality of fitting samples comprises:
      determining, for each primary reference sample, a respective primary offset value between the primary reference sample value and a corresponding fitting sample value,
      predicting a respective secondary offset value at each secondary reference sample position based on at least a subset of the plurality of primary offset values and the selected intra prediction mode, and
      generating a respective secondary reference sample value based on the respective secondary offset value and the fitting sample value of the respective fitting sample.

14. A non-transitory computer-readable medium comprising program code which, when executed by a processor, causes the method of claim 13 to be performed.

* * * * *